Oct. 26, 1937.    C. D. MacVEAN    2,097,219
ICING MACHINE
Filed Dec. 12, 1936    3 Sheets-Sheet 1
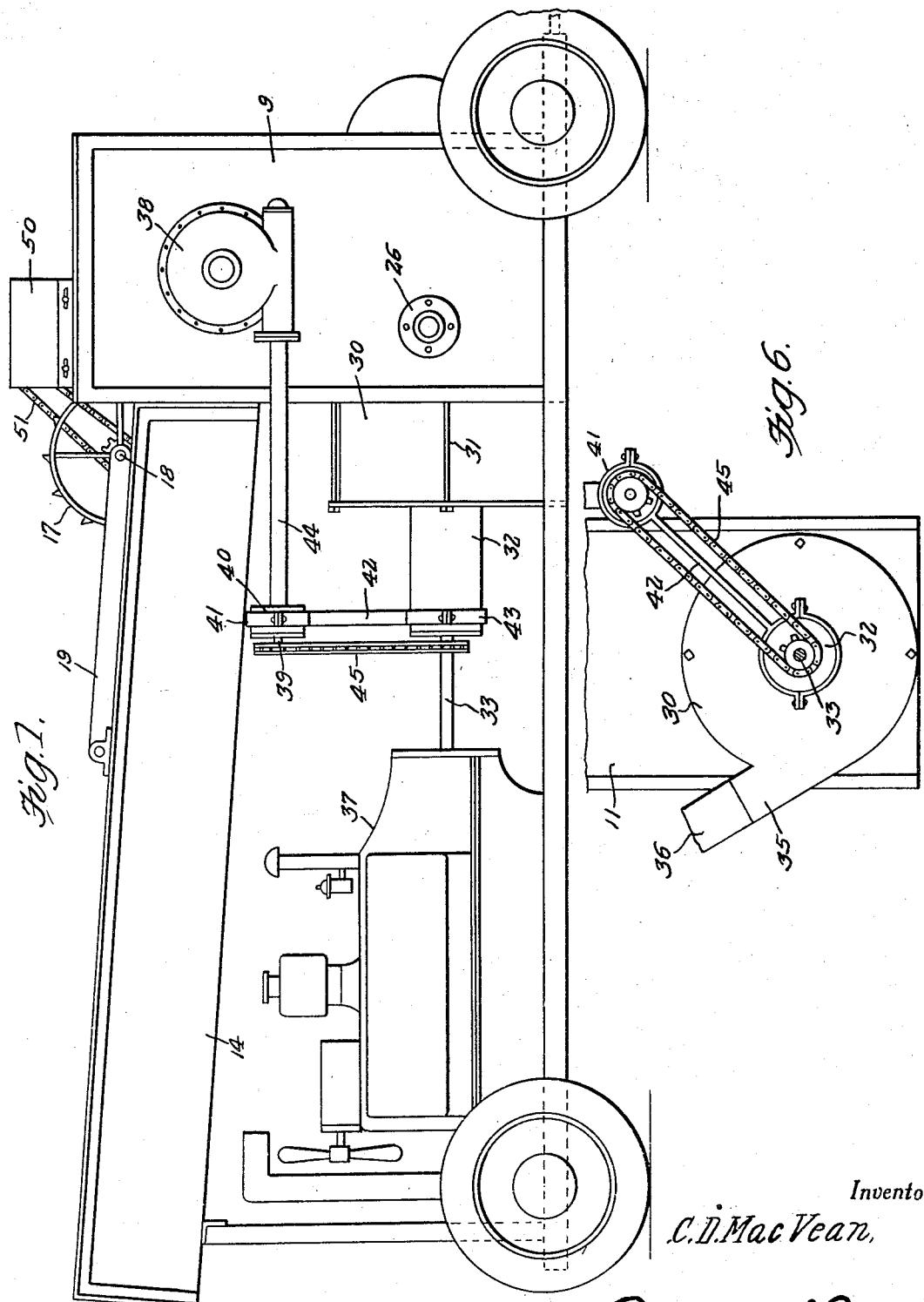
Inventor
C. D. MacVean,
By Clarence A. O'Brien
Hyman Berman
Attorneys Oct. 26, 1937.  C. D. MacVEAN  2,097,219
ICING MACHINE
Filed Dec. 12, 1936  3 Sheets-Sheet 2
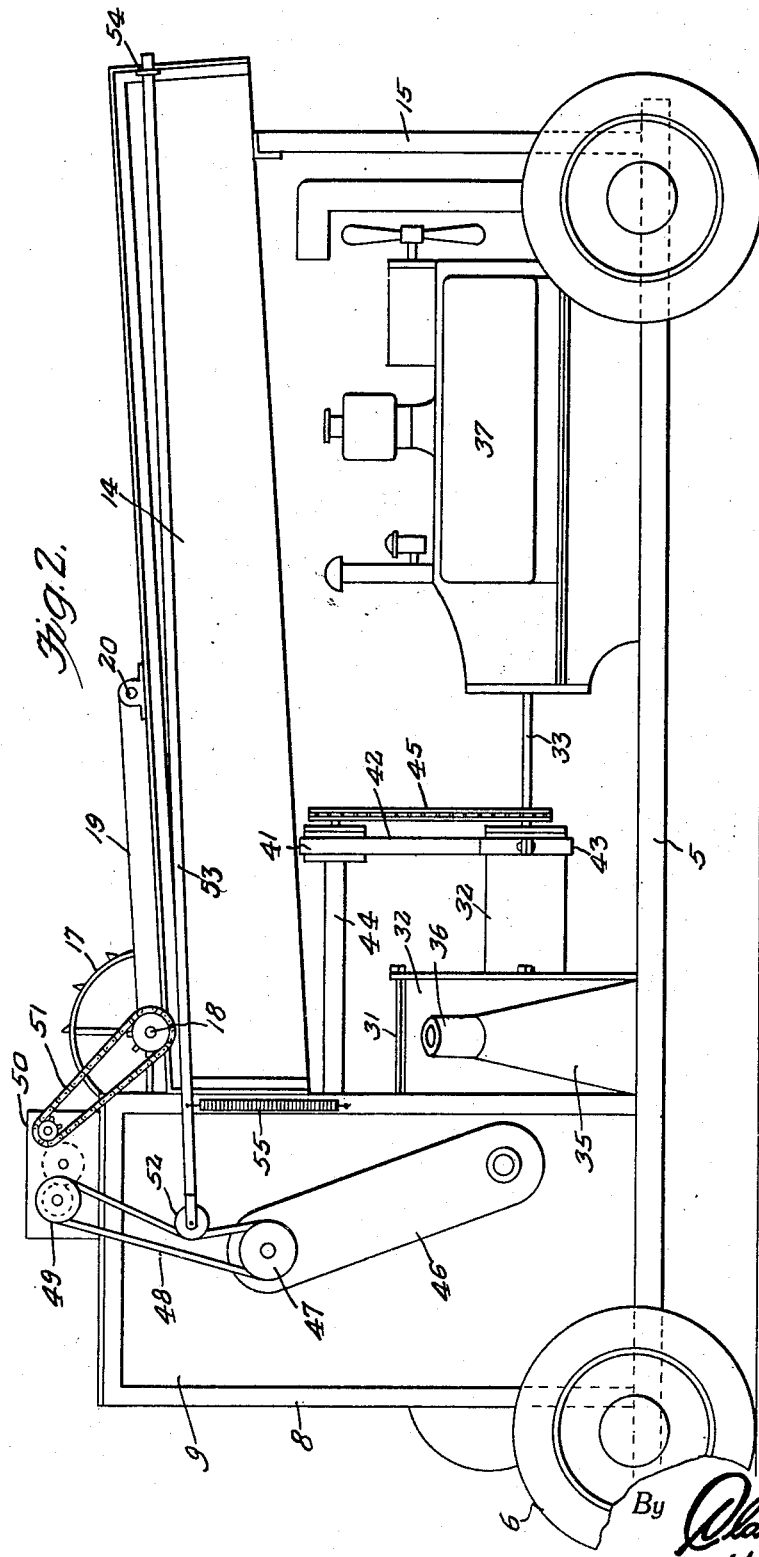
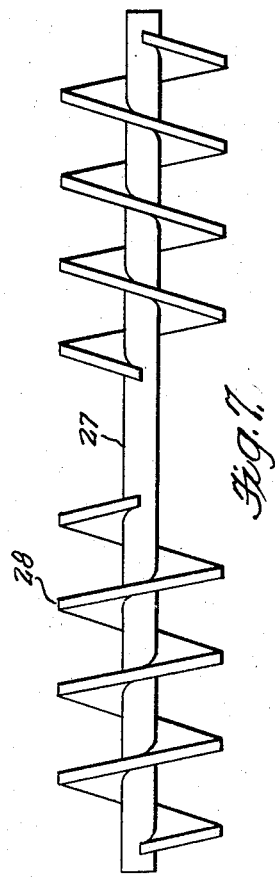
Inventor
C. D. MacVean.
By Clarence A. O'Brien
Hyman Berman
Attorneys Oct. 26, 1937.  C. D. MacVEAN  2,097,219
ICING MACHINE
Filed Dec. 12, 1936    3 Sheets—Sheet 3
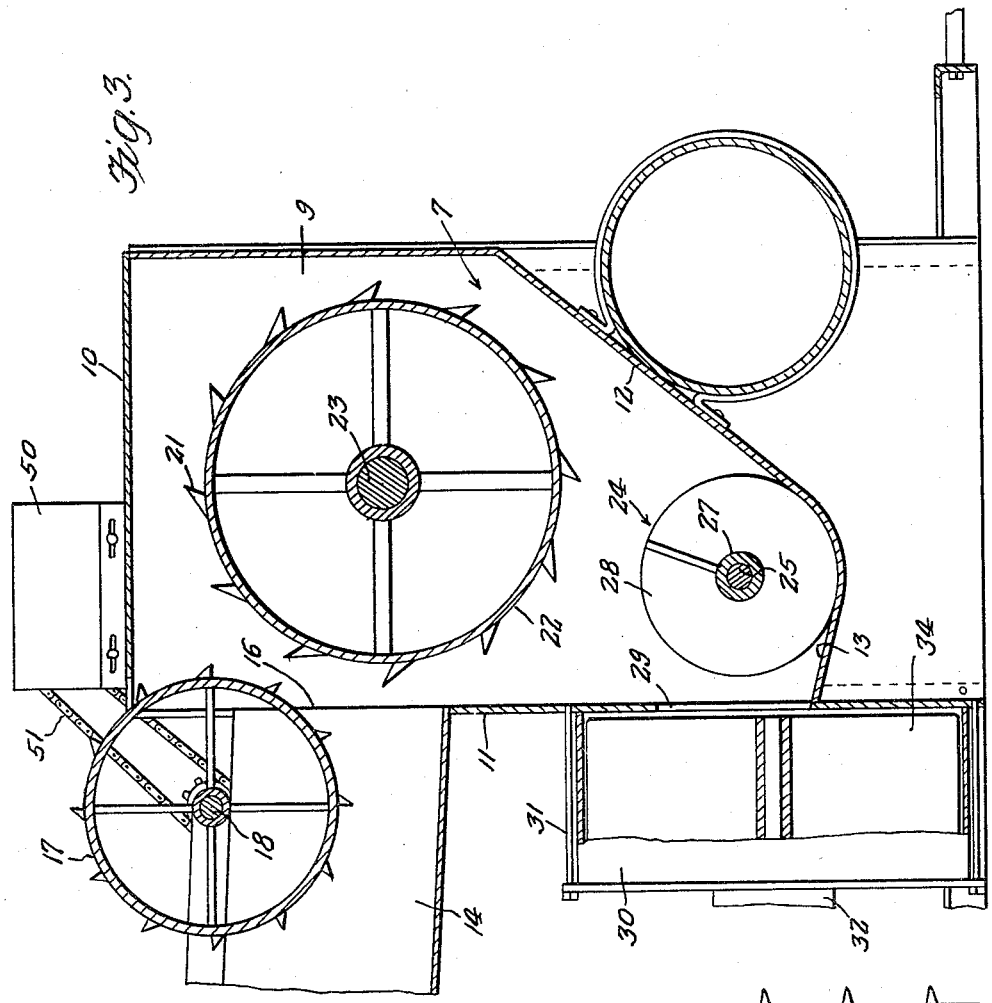
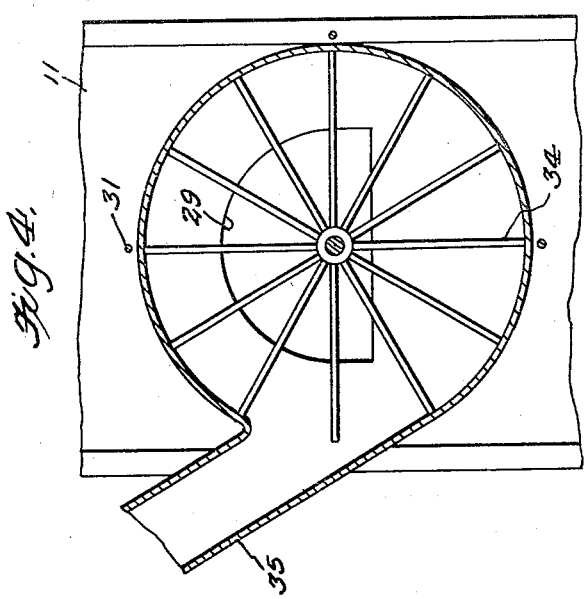
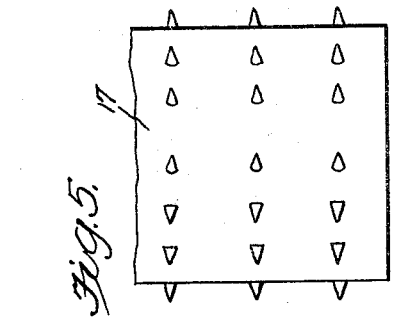
Inventor
C. D. MacVean.
By *Clarence A. O'Brien*
*Hyman Berman*
Attorneys Patented Oct. 26, 1937

2,097,219

UNITED STATES PATENT OFFICE 2,097,219

ICING MACHINE

Creighton D. MacVean, Mercedes, Tex.

Application December 12, 1936, Serial No. 115,615

3 Claims. (Cl. 83—63)

This invention is an apparatus or machine for supplying crushed ice to refrigerator cars and analogous vehicles and an object of the invention is to provide a machine which will facilitate the handling of blocks of ice, the crushing of the ice and the charging of the refrigerator car with the crushed ice.

A further object of the invention is to provide a machine or apparatus of the character mentioned which may be in actual practice, either in the nature of a stationary machine or of a trailer vehicle.

The invention together with its objects and advantages will be best understood from a study of the following description taken in connection with the accompanying drawings wherein:—

Figure 1 is a side elevational view of an icing machine embodying the features of the present invention.

Figure 2 is a view similar to Figure 1 but viewing the machine from the side thereof opposite to that shown in Figure 1.

Figure 3 is an enlarged sectional view showing a portion of the chute, crushing chamber and blower part of the ice slinger.

Figure 4 is a sectional view through the casing forming part of the ice slinger.

Figure 5 is a fragmentary plan view of a feeding cylinder.

Figure 6 is a fragmentary detail view showing the drive means for the blower fan of the ice slinger.

Figure 7 is an elevational view of a screw conveyor.

Referring to the drawings more in detail it will be seen that while it is also contemplated to practice the invention in the form of a platform or stationary machine I have illustrated the invention as being in the nature of a trailer vehicle. In the preferred embodiment of the invention illustrated the trailer vehicle comprises a frame 5 mounted at the front and rear thereof on traction wheels 6. At one end thereof the vehicle will be provided with a suitable draft tongue through the medium of which the vehicle may be coupled to a suitable draft vehicle.

Suitably provided at one end of the frame 5 of the vehicle is a crushing chamber 7. The chamber 7 may be constructed in any suitable manner and is shown as consisting of a suitable frame 8, and walls 9, 10, 11 and 12, the wall 12 forming an inclined bottom wall for the chamber and merging at its lower end into somewhat of a trough-like section 13.

Also mounted on the vehicle is an inclined chute 14 that is channel-shaped in cross-section and is supported at one end through the medium of standards 15 while at its lower end the chute 14 is suitably supported from the wall 11 in alignment with an opening 16 in said wall.

Mounted at the lower or discharge end of the chute 14 is a toothed feeding drum 17 the shaft of which is indicated by the reference numeral 18 and is journaled in the end of bearing bars 19 which at one end are hinged to the side walls of the chute 14 as at 20. Thus it will be seen that the drum 17 may be placed adjacent either end of the chute 14 by the simple expediency of swinging the arms 19 about the pivots 20 in the proper direction.

The drum 17 is provided for feeding the blocks of ice through the opening 16 to be subjected to the crushing action of the teeth 21 of a relatively large crushing cylinder or drum 22 that is mounted on a shaft 23 suitably journaled in the chamber 7.

In the bottom of the chamber working within the trough 13 is a screw conveyor 24 that comprises a shaft 25 suitably journaled in bearings 26 provided on the walls 9 of chamber 7 and an elongated tubular hub 27 suitably secured to the shaft 25 to turn therewith together with a pair of oppositely pitched spiral vanes 28. The vanes 28 serve to direct the crushed ice from opposite sides of the chamber 7 towards the center of the chamber for crowding or forcing the crushed ice through an opening 29 provided in the wall 11 of the chamber 7 and into the casing 30 forming part of what may be termed an ice slinger which will be hereinafter more fully referred to in detail.

The ice slinger, just mentioned comprises the aforementioned casing 30 which is secured to the wall 11 of the chamber 7 through the medium of tie bolt 31. The casing 30 is provided at the center thereof with a bearing 32 that projects outwardly from an end wall of the casing and which accommodates a shaft 33. The shaft 33 has one end terminating in the casing 30 and mounted on said end of the shaft to rotate therewith is a fan 34 which serves to draw the crushed ice into the casing 30 and to force the ice, under pressure, from the chamber 30 through a spout 35 connected with the chamber, and a flexible conduit or hose 36 connected with the spout and which hose is used for directing the crushed ice into the refrigerator car or analogous vehicle.

The shaft 33 has a direct drive connection with the shaft of a prime mover, in the present instance an internal combustion engine 37 suitably mounted on the vehicle.

For driving the shaft 23 of the crushing drum 22 there is suitably mounted on one of the side wall sides of chamber 7 a gear casing 38 which houses a worm wheel on one end of the shaft 23 and a worm meshing with the worm wheel (the worm wheel and worm not being shown). Said worm is provided on one end of a shaft 39 that has its opposite end journaled in a bearing 40 secured within a clamp 41 on one end of a bar 42. At its opposite end bar 42 is provided with a clamp 43 through the medium of which the bar is rigidly secured to the shaft housing or bearing 32. Housing the shaft 39 is a tubular casing 44 that extends from the bearing 40 to the gear case 38.

The shaft 39 is driven from the shaft 33 through, in the present instance, chain and sprocket gearing 45. (See Figure 6.)

Shaft 23 of the crushing drum 22 is operatively connected with the shaft 25 of the conveyor 24 through the medium of a chain and sprocket mechanism (not shown) and housed within a suitable housing or casing 46 mounted on the opposite wall 9 of the chamber 7.

At the last named end thereof the shaft 23 extends through the casing 46 and is equipped with a pulley 47 over which is trained a belt 48 that is also trained over a pulley 49 provided on one end of a shaft forming part of a gear train housed within a casing 50 mounted on the top 10 of the chamber 7 (see Figures 1, 2 and 3).

The gear train within the housing or casing 50 also includes a shaft one end of which extends outwardly of the casing or housing 50 and is connected with one end of the shaft 18 of the feeding drum 17 through the medium of a chain and sprocket means 51.

For taking up slack in the belt 48 there is provided an idler pulley 52 journaled in a bracket provided on one end of a rod 53.

Rod 53 has one end loosely fitting in a bracket 54 mounted on one side of the chute 14 at the end of the chute farthest remote from the chamber 7; and the idler pulley 52 is yieldably urged into engagement with one run of the belt 48 through the medium of a spring 55 anchored at one end to a part of the frame 8 of the chamber 7 and secured at its relatively opposite end to the bar 53 for yieldably urging the same downwardly and the pulley 52 into engagement with the belt 48. (See Figure 2.)

From the above, it will be seen that fan 34, conveyor 24, crusher drum 22 and feed drum 17 are all driven from the motor 37. Thus with the motor in operation blocks of ice are placed in the chute 17 to be successively engaged by the teeth of the drum 17 to be fed by the drum through the opening 16 where the blocks are subjected to the crushing effect of the teeth 21 of the drum 22. The crushed ice collects in the bottom of the chamber 7 and is gathered from opposite sides of the chamber through the medium of the conveyor 24 to pass through the opening 29 into the casing 30. From the casing 30 the crushed ice is forced through the spout 35 and the hose or conduit 36 into the refrigerator car or other depository.

It will thus be seen that with a device or machine of this character blocks of ice can be readily crushed and under pressure forced into a refrigerator car or the like to the end that the filling of the refrigerator car to the desired amount with ice may be accomplished with minimum man power and effort and in a comparatively short span of time.

It is thought that a clear understanding of the construction, utility and advantages of an invention of this character will be had without a more detailed description.

Having thus described the invention, what is claimed is:—

1. In a device of the character described, a casing provided with a chamber having an inlet opening at one side thereof, a delivery chute for ice blocks connected at one end with said chamber in alignment with said inlet opening a pair of bearing bars pivotally connected at one end to an intermediate portion of the chute, a feed drum journalled at the opposite ends of said bars, said bars being swingable for selectively positioning the feed drum adjacent opposite ends of the chute, and a crushing drum rotatably mounted within said chamber and provided on the periphery thereof with spaced circumferentially extending rows of pointed crushing teeth.

2. In a device of the character described, a casing provided with a chamber having an inlet opening at one side thereof, a delivery chute for ice blocks connected at one end with said chamber in alignment with said inlet opening, and a crushing drum rotatably mounted within said chamber and provided on the periphery thereof with spaced circumferentially extending rows of pointed crushing teeth, said chamber being also provided at the bottom thereof with a lateral discharge opening, and a screw conveyor mounted in the bottom of the chamber and provided with sections of oppositely pitched spiral vanes for drawing the crushed ice from opposite sides of the chamber toward the center thereof to be forced through said discharge opening, a fan chamber mounted at one side of the first named casing in proximity to the discharge opening for receiving the crushed ice from the crushing chamber, and a fan in said fan chamber for forcing said crushed ice under pressure from the fan chamber, the fan chamber being provided with a spout and a conduit connected with the spout for conveying the crushed ice to the desired depository, and a toothed drum rotatably supported across said chute at the end thereof connected with the first named casing for feeding the blocks of ice to the crushing drum within said crushing chamber, and means connected with said crushing drum, said conveyor, said fan, and said feeding drum for driving them.

3. In a device of the character described, a casing provided with a chamber having an inlet opening at one side thereof, a delivery chute for ice blocks connected at one end with said chamber in alignment with said inlet opening, and a crushing drum rotatably mounted within said chamber and provided on the periphery thereof with spaced circumferentially extending rows of pointed crushing teeth, said chamber being also provided at the bottom thereof with a lateral discharge opening, and a screw conveyor mounted in the bottom of the chamber and provided with sections of oppositely pitched spiral vanes for drawing the crushed ice from opposite sides of the chamber toward the center thereof to be forced through said discharge opening, a fan chamber mounted at one side of the first named casing in proximity to the discharge opening for receiving the crushed ice from the crushing chamber, and a fan in said fan chamber for forcing said crushed ice under pressure from the fan chamber, the fan chamber being provided with a spout and a conduit connected with the spout for conveying the crushed ice to the desired depository, and a toothed drum rotatably supported across said chute at the end thereof connected with the first named casing for feeding the blocks of ice to the crushing drum within said crushing chamber, a prime mover, and driving mechanisms connecting the prime mover with said crushing drum, conveyor, fan, and feeding drum for driving them from said prime mover.

CREIGHTON D. MacVEAN.